United States Patent
Janas et al.

(10) Patent No.: US 10,304,232 B2
(45) Date of Patent: May 28, 2019

(54) IMAGE ANIMATION IN A PRESENTATION DOCUMENT (71) Applicant: Microsoft Technology Licensing, LLC, Redmond, WA (US)

(72) Inventors: Lauren M. Janas, Palo Alto, CA (US); Derek M. Johnson, Mountain View, CA (US); Alexandre Gueniot, Mountain View, CA (US); Sushant Sharma, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/481,173

(22) Filed: Apr. 6, 2017

(65) Prior Publication Data
US 2018/0293775 A1 Oct. 11, 2018

(51) Int. Cl.
*G06T 13/80* (2011.01)

(52) U.S. Cl.
CPC .................... *G06T 13/80* (2013.01)

(58) Field of Classification Search
None
See application file for complete search history.

(56) References Cited

U.S. PATENT DOCUMENTS

| | | | |
|---|---|---|---|
| 8,907,957 B2 | 12/2014 | Gehani et al. | |
| 9,098,512 B2 | 8/2015 | Berglund et al. | |
| 2003/0051255 A1* | 3/2003 | Bulman | G06Q 30/00 725/135 |
| 2014/0085524 A1 | 3/2014 | Berglund et al. | |
| 2014/0328570 A1* | 11/2014 | Cheng | G11B 27/10 386/241 |
| 2015/0106722 A1* | 4/2015 | Ubillos | G06F 3/0488 715/731 |
| 2015/0121232 A1 | 4/2015 | Edwardson et al. | |

OTHER PUBLICATIONS

Coppock, Mark, "August Insider Slow update for Mac Office 2016 brings Outlook enhancements, PowerPoint background animations, and more", https://www.onmsft.com/news/august-insider-slow-update-mac-office-2016-brings-outlook-enhancements-powerpoint-background-animations, Retrieved on: Dec. 30, 2016, 7 pages.

(Continued)

*Primary Examiner* — Said Broome
(74) *Attorney, Agent, or Firm* — Michael Best & Friedrich LLP (57) ABSTRACT

System and method for applying presentation templates with image animation to presentation documents. A processor identifies a presentation document including an image and identifies a characteristic of the image. The processor further selects a presentation template with image animation from a plurality of available presentation templates. The selection of the processor is based on the characteristic of the image. The processor further applies the presentation template with animation of the image to the presentation document to define animation of the image. The processor then outputs the presentation document with the presentation template applied.

20 Claims, 7 Drawing Sheets

(56) References Cited

OTHER PUBLICATIONS

Lia, "How to Reveal a Moving Background Animation Effect in PowerPoint", https://nutsandboltsspeedtraining.com/spicypresentations/how-to-reveal-a-moving-background-animation-effect-in-powerpoint/, Published on: Dec. 10, 2014, 46 pages.

Bradley, Helen, "PowerPoint 2003: How to Animate a Slide Background", http://www.smallbusinesscomputing.com/buyersguide/article.php/3852451/PowerPoint-2003-How-to-Animate-a-Slide-Background.htm, Published on: Dec. 10, 2009, 7 pages.

"Awesome Moving Backgrounds for PowerPoint Presentations", http://www.free-power-point-templates.com/articles/awesome-moving-backgrounds-for-powerpoint-presentations/, Retrieved on: Dec. 30, 2016, 16 pages.

Keating, Jody, "Flash MX Animation Techniques", http://www.peachpit.com/articles/article.aspx?p=27775&seqNum=6http://www.peachpit.com/articles/article.aspx?p=27775&seqNum=6http://www.peachpit.com/articles/article.aspx?p=27775, Published on: Jul. 19, 2002, 4 pages.

"Autodesk 3DS Max 2014", http://web.archive.org/web/20141007060909/http:/docs.autodesk.com/3DSMAX/16/ENU/3ds-Max-Help/index.html?url=files/GUID-D1419AE6-1CDE-44FC-8D46-E77F8F4DD2D0.htm, topicNumber=d30e575543, Published on: Oct. 7, 2014, 6 pages.

Kumar, Santosh, "Animated Changing Color", http://web.archive.org/web/20091029154332/http://tutorialbunch.com/photoshop/animation/animated-changing-color.shtml, Published on: Oct. 29, 2009, 3 pages.

"Animations overview", http://web.archive.org/web/20161115181223/https://msdn.microsoft.com/en-us/windows/uwp/graphics/animations-overview, Published on: Nov. 15, 2016, 16 pages.

"Animate the background of your slides in PowerPoint 2016 for Mac", https://support.office.com/en-us/article/Animate-the-background-of-your-slides-in-PowerPoint-2016-for-Mac-fe66ad2b-51f6-4956-b6d2-697a78c76e45, Retrieved on: Jan. 6, 2016, 3 pages.

"Sway updates—create interactive charts, image Focus Points, Accent, easier document embeds and Sway for iPhone updates", https://web.archive.org/web/20150706133733/https://blogs.office.com/2015/04/17/sway-updates-create-interactive-charts-image-focus-points-accent-easier-document-embeds-and-sway-for-iphone-updates/, Retrieved on: Mar. 9, 2017, 8 pages.

Baja, Geetesh, "Focus Point for Pictures within Sway", http://www.indezine.com/products/sway/focus-point-for-pictures-sway.html, Retrieved on: Mar. 9, 2017, 4 pages.

"About PowerPoint Designer", https://support.office.com/en-us/article/About-PowerPoint-Designer-53c77d7b-dc40-45c2-b684-81415eac0617, Retrieved on: Feb. 16, 2017, 8 pages.

* cited by examiner

IMAGE ANIMATION IN A PRESENTATION DOCUMENT

FIELD

Embodiments described herein relate to animating images in a presentation document.

BACKGROUND

Presentation documents, such as a digital slideshow generated in Microsoft PowerPoint, a digital word processing document generated in Microsoft Word, or a digital online presentation generated in Microsoft Sway, may include text, images, and other content. A presentation document may include a template that defines characteristics of the document, such as a color scheme, text size, font type, image size, and layout of content. Templates may be created by users or may be obtained by users from a repository of templates, which may be maintained on a network-accessible database. Additionally, certain content may be animated in a presentation document. For example, text in a slide of a digital slideshow may appear after a predetermined time delay or upon a mouse click, or an image may fade in on, fade out of, or be panned across the slide. In some instances, software may be used to automatically detect points of interest on an image and apply animation based on the detected points. For example, the image may be panned from a first detected point of the image to a second detected point of the image while presenting a slide.

SUMMARY

Animation of an image in a presentation document can enhance the aesthetics of the presentation documents and render the document more effective in capturing the attention of an audience. However, adding animation to a presentation document can be time consuming and can require significant design skill and experience to effectively animate images in an aesthetically pleasing or audience capturing manner. For example, manual selection of appropriate animation actions (for example, zoom, pan, or rotate) in an effective quantity and mapped to effective regions of an image to be animated can be challenging. Further, certain presentation documents and certain images are not suitable for image animation. For example, small or low resolution images, when magnified by a zooming animation action, may appear to be of low quality and may be distracting to the audience and aesthetically unpleasing. Accordingly, current techniques do not effectively promote the use of image animation and, even when implemented, may include ineffective image animation. Embodiments described herein provide effective and efficient techniques for including image animation within presentation documents.

In one embodiment, a system for presentation template application is provided. The system includes a memory storing instructions and a processor that is coupled to the memory and that is configured to execute the instructions. Through executing the instructions, the processor identifies a presentation document including an image and identifies a characteristic of the image. The processor further selects a presentation template with image animation from a plurality of available presentation templates, where the selection is based on the characteristic of the image. The processor further applies the presentation template with image animation to the presentation document to define animation of the image. Additionally, the processor outputs the presentation document with the presentation template applied.

In another embodiment, a method for presentation template application is provided. The method includes identifying, by a processor, a presentation document including an image, and identifying, by the processor, a characteristic of the image. The method further includes selecting, by the processor, a presentation template with image animation from a plurality of available presentation templates. The selection is based on the characteristic of the image. The method also includes applying, by the processor, the presentation template with image animation to the presentation document to define animation of the image. The processor then outputs the presentation document with the presentation template applied.

BRIEF DESCRIPTION OF THE DRAWINGS

The accompanying figures, where like reference numerals refer to identical or functionally similar elements throughout the separate views, together with the detailed description below, are incorporated in and form part of the specification, serve to further illustrate embodiments of concepts that include the claimed invention, and explain various principles and advantages of those embodiments

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more processors configured to perform the described functionality by executing instructions stored in non-transitory, computer-readable medium. Similarly, embodiments described herein may be implemented as non-transitory, computer-readable medium storing instructions executable by one or more processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1A:
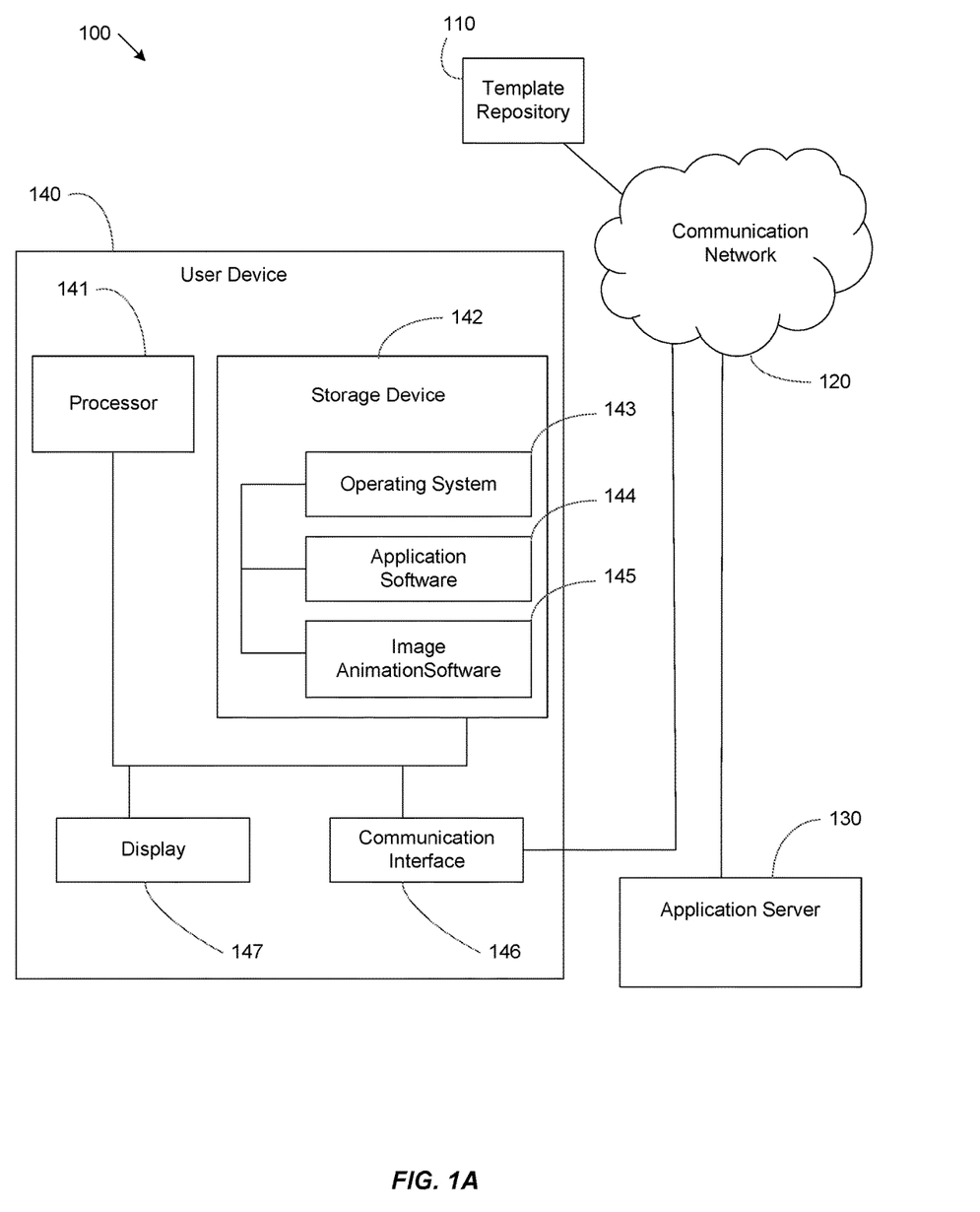
FIG. 1A illustrates an image animation system.

FIG. 1A is a block diagram of an example embodiment of image animation system 100 providing animation to images in presentation documents. The system 100 includes a template repository 110, communication network 120, application server 130, user device 140. Communication network 120 may be a wired or wireless communication network. Portions of the communication network 120 may be implemented using a wide area network, a local area network (for example, a Bluetooth™ network or Wi-Fi network), and combinations or derivatives thereof.

The user device 140 may be a laptop or desktop computer, a tablet computer, smart phone, or other computing device. The user device 140 includes a processor 141, a storage device 142 (also referred to as a memory), and communication interface 146. The processor 141, storage device 142, and communication interface 146 communicate over one or more communication lines or buses, wireless connections, or a combination thereof. It should be understood that, in various configurations, user device 140 may include additional or alternative components than those illustrated in FIG. 1A and may perform additional functions than the functionality described herein. For example, in some embodiments, the user device 140 includes peripherals, for example, one or more output devices, for example, a display 147, a speaker (not shown), or the like, and one or more input devices, for example, a keypad, a touchscreen (for example, as part of the display 147), a microphone, a camera, or the like (not shown).

The processor 141 may include one or more microprocessors, application-specific integrated circuits (ASICs), or other suitable electronic devices. The storage device 142 includes a non-transitory, computer readable medium. As used in the present application, non-transitory computer-readable medium comprises all computer-readable media except for a transitory, propagating signal. Accordingly, the storage device 142 may include, for example, a hard disk, an optical storage device, a magnetic storage device, ROM (read only memory), RAM (random access memory), register memory, a processor cache, or a combination thereof.

The communication interface 146 sends data to external devices or networks, receives data from external devices or networks, or a combination thereof. The communication network 120 is an example of such a network, and the application server 130 is an example of such an external device. The communication interface 146 may include a transceiver for wirelessly communicating over communication network 120 and, optionally, one or more additional communication networks or connections. Additionally or alternatively, in some embodiments, the communication interface 146 includes a port for receiving a wire or cable, for example, an Ethernet cable or Universal Serial Bus (USB) cable, to facilitate a connection to an external device or network.

Returning to the user device 140, the processor 141 is electrically connected to and executes instructions stored in the storage device 142. In particular, as illustrated in FIG. 1A, the storage device 142 stores an operating system 143, application software 144, and image animation software 145. Processor 141 executes the operating system 143, application software 144, and image animation software 145. The application software 144 is document processing software configured, for example, for creating, editing, and displaying presentation documents. Presentation documents are digital documents that may include text data, image data, video data, as well as other audio and visual data. The processor 141 is operable to receive input from a user (for example, via a keyboard and other input devices) to create and edit presentation documents via the application software 144, and is operable to output presentation documents generated via the application software 144, such as via the display 147 and other output devices. The presentation documents may be stored in the storage device 142 or other storage devices in communication with the user device 140.

The template repository 110 includes a plurality of presentation templates stored in a storage device similar to the storage device 142. The template repository 110 is accessible by the processor 141, for example, via the communication network 120. In some embodiments, the template repository 110 is stored on the storage device 142 or on the application server 130, rather than on a separate storage device as illustrated in FIG. 1A. As described in further detail below, the presentation templates may define various attributes for a presentation document.

FIG. 1A illustrates only one example of the image animation system 100. The system 100 may include additional or fewer components in configurations different from the configuration illustrated in FIG. 1A.

Figure 1B:
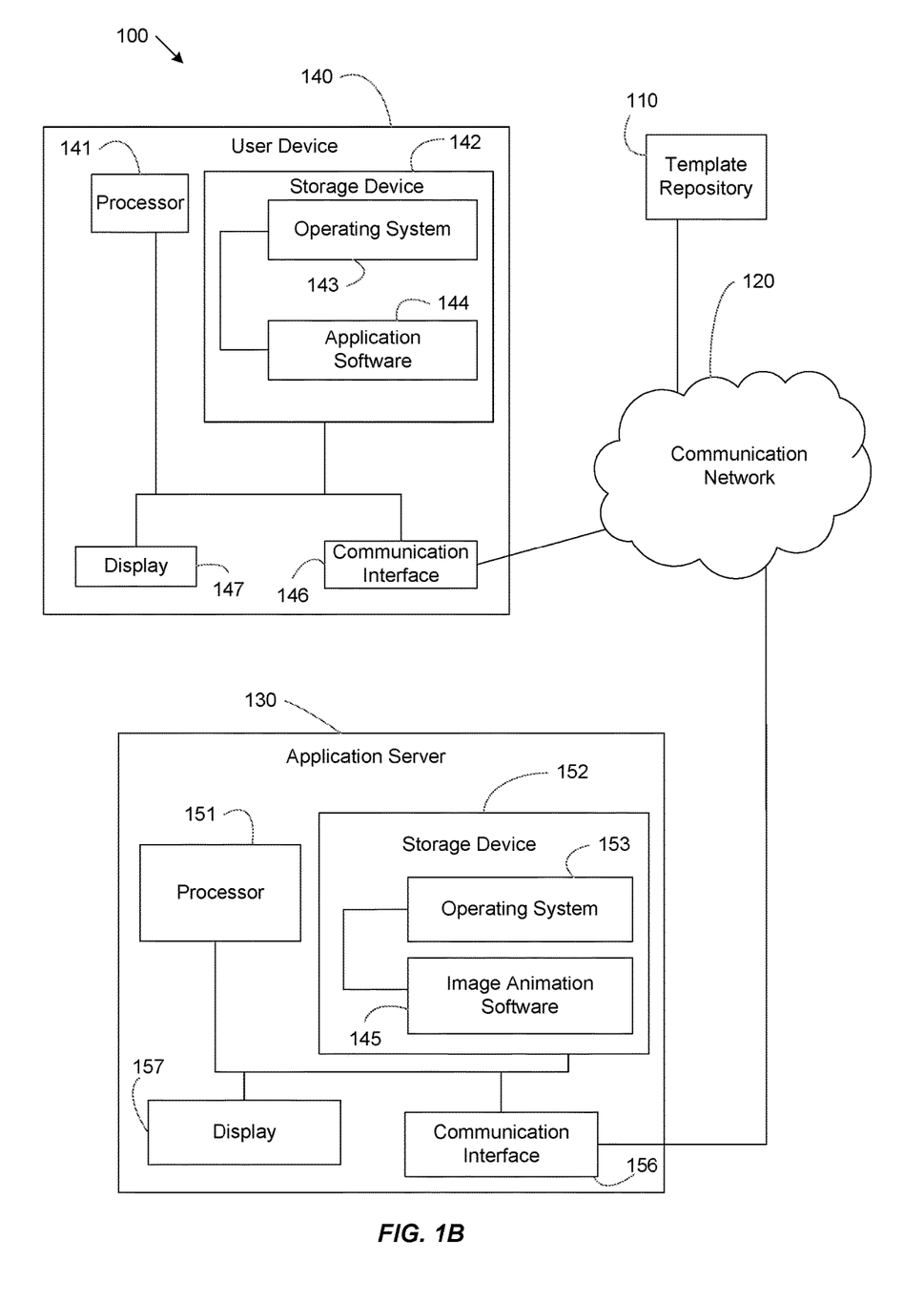
FIG. 1B illustrates another embodiment of the image animation system.

FIG. 1B illustrates another embodiment of the system 100, identified as an image animation system 150. In FIG. 1B, except as otherwise noted, elements with label numbers that are the same as those of elements in FIG. 1A are similar and function similarly to the like-numbered elements of FIG. 1A. In FIG. 1B, the application server 130 is illustrated in further detail. In particular, the application server 130 includes a processor 151 and a storage device 152 (also referred to as a memory) including an operating system 133 and image animation software 145. The application server 130 further includes a communication interface 136 and a display 137.

The processor 151, storage device 152, and communication interface 156 communicate over one or more communication lines or buses, wireless connections, or a combination thereof. It should be understood that, in various configurations, the application server 130 may include additional or alternative components than those illustrated in FIG. 1B and may perform additional functions than the functionality described herein. For example, in some embodiments, the application server 130 includes peripherals, for example, one or more output devices, for example, the display 157, a speaker (not shown), or the like, and one or more input devices, for example, a keypad, a touchscreen (for example, as part of the display 157), a microphone, a camera, or the like (not shown).

The processor 151 may include one or more microprocessors, application-specific integrated circuits (ASICs), or other suitable electronic devices. The storage device 152 includes a non-transitory, computer readable medium. Accordingly, the storage device 152 may include, for example, a hard disk, an optical storage device, a magnetic storage device, ROM (read only memory), RAM (random access memory), register memory, a processor cache, or a combination thereof.

The communication interface 156 sends data to external devices or networks, receives data from external devices or networks, or a combination thereof. The communication network 120 is an example of such a network, and the user device 140 is an example of such an external device. The communication interface 156 may include a transceiver for wirelessly communicating over communication network 120 and, optionally, one or more additional communication networks or connections. Additionally or alternatively, in some embodiments, the communication interface 156 includes a port for receiving a wire or cable, for example, an Ethernet cable or Universal Serial Bus (USB) cable, to facilitate a connection to an external device or network.

Returning to the application server 130, the processor 151 is electrically connected to and executes instructions stored in the storage device 152. For example, the processor 151 executes the operating system 153 and image animation software 155 to carry out various functions, some of which are described in further detail herein.

The template repository 110 is accessible by the processor 151, for example, via the communication network 120. In some embodiments, the template repository 110 is stored on the storage device 142 or on the storage device 152, rather than on a separate storage device as illustrated in FIG. 1B.

FIG. 1B illustrates only one example of the system 150. The system 150 may include additional or fewer components in configurations different from the configuration illustrated in FIG. 1B. For example, the system 150 may include a plurality of the user devices 140 in communication with the application server 130 over the communication network 120.

In FIG. 1B, in contrast to FIG. 1A, the image animation software 145 resides on the application server 130. As described in further detail below, the user device 140 is operable to access functionality of the image animation software 145 via communications over the communication network 120 with the application server 130. In some embodiments, the image animation software 145 may reside on both the user device 140 and the application server 130. In these embodiments, as an example, the user device 140 is operable to access the image animation software 145 on the application server 130 when the communication network 120 is available, and, in the instance of a network outage, the user device 140 is operable to access the image animation software 145 locally on the storage device 142.

Figure 2:
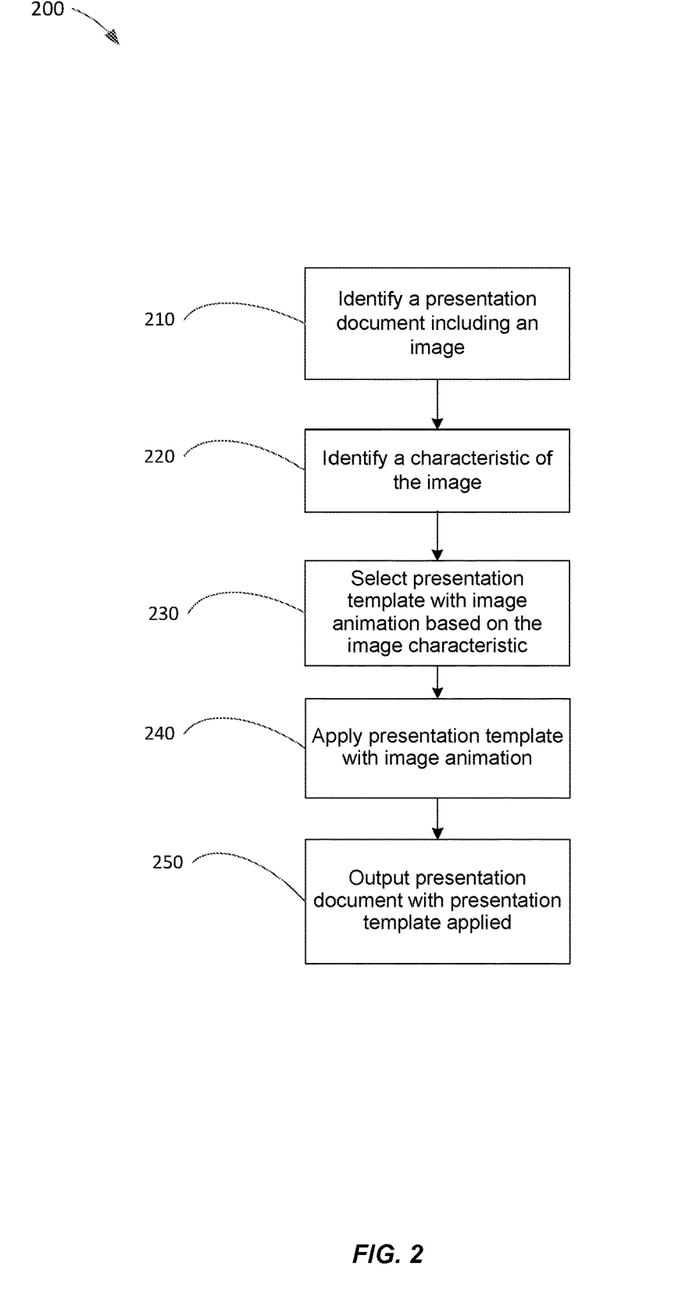
FIG. 2 illustrates a method for presentation template application, which may use the image animation system of FIG. 1A or 1B.

FIG. 2 illustrates a method 200 for presentation template application, according to one embodiment. The method 200 is described with respect to the image animation systems 100 and 150 described above; however, in some embodiments, other image animation systems are used to implement the method 200. At block 210, a processor, such as the processor 141 or the processor 151 executing the image animation software 145, identifies a presentation document including an image (at block 210). For example, the processor 141, executing the image animation software 144, may receive user input that selects a presentation document previously created and saved in the storage device 142 or a presentation document currently being edited via application software 144 based on user input. In response, the processor 141 identifies the presentation document, and identifies the presentation document as having an image. The image, which is a digital image, may be embedded within a slide or window of the presentation document, and may be of various digital image format types (for example, a Joint Photographic Experts Group (JPEG) image, a Portable Network Graphics (PNG) image, a Graphics Interchange Format (GIF) image, and the like). The image may be a background image positioned behind at least one other layer of content, a foreground image positioned in front of at least one other layer of content, or an image positioned between layers of content. In some embodiments, the processor 141, executing the image animation software 145, identifies the presentation document upon receipt of the presentation document from an external device (for example, another user device, the application server 130, or another server device) via the communication network 120. In some embodiments, the processor 151, executing the image animation software 145, identifies the presentation document upon receipt of the presentation document from an external device (for example, the user device 140) via the communication network 120. For example, the processor 141, executing the application software 145, may transmit the presentation document to the processor 151 via the communication network 120 based on user input received at the user device 140.

In block 220, the processor, such as the processor 141 or the processor 151 executing the image animation software 145, identifies a characteristic of the image of the presentation document. Identified image characteristics may include one or more of image size, resolution, aspect ratio, content type (for example, text, chart, illustration, photograph, image with a face), number of salient regions, as well as other characteristics. The image characteristic may be identified through various techniques. For example, the image may be associated with a data file including attributes, metadata, or both specifying the characteristic, and the processor may access these attributes and metadata. Additionally or alternatively, the processor executing the image animation software 145 may include image processing software that analyzes the image to determine the characteristic. For example, the image processing software may analyze the image to detect salient regions within the image, as described in further detail below.

In block 230, the processor, such as the processor 141 or the processor 151 executing the image animation software 145, selects a presentation template with image animation based on the characteristic of the image. In some embodiments, the processor executing the image animation software 145 accesses the template repository 110 to select a presentation template, from the plurality of presentation templates stored in the template repository 110, to be applied to the presentation document. The presentation templates may have various attributes including a color scheme (for example, text color, background color, and line color), a layout, an animation indication, and an animation definition for a presentation document. The layout may specify a location of text on a presentation document (for example, of a heading, body, lists and the like), a location of one or more images on the presentation document, a visible region on the presentation document, a target region on the presentation document, and an obscured region of the document. The visible region of a presentation document is, for example, an area for document content that is visible, even if partially obstructed by text or under content that is partially transparent. The target region of a presentation document is, for example, an unobstructed area open for document content, such as an image to be animated. The obscured region of the document is, for example, an area in the document having content specified by the template as a top layer that obstructs content in lower layers. The animation indication is an indication of whether animation of an image is specified in the presentation template. The animation definition is a specification of the animation actions that are to be applied to the image, such as zooming to a focus point, panning between focus points, an order of animation steps to be applied, a delay time between actions, and whether the animation is to be repeated or looped.

Returning to the selection of block 230, the processor determines whether the image in the identified presentation document is a candidate for animation based on the image characteristic. For example, the processor will determine that an image is a candidate for animation when the image has one or more of the following characteristics: an image resolution above a resolution threshold; an image size above a size threshold; content type indicating an ability to be cropped, indicating the presence of a human or animal face in the image, or indicating that the image is a digital photograph; an aspect ratio within an aspect ratio range; and a number of salient regions within a desired range. In the context of this application, an image may be considered to have content type indicating an ability to be cropped when the image can be cropped without losing certain content, such as text or chart data. In other words, an image having a textual phrase may be considered as not being able to be cropped, or an image having a textual phrase of a certain size (whether absolute or percentage size of the overall image) may be considered as not being able to be cropped if the phrase would lose characters through the cropping. In some embodiments, the desired range of the number of salient regions is two to five, two to seven, or three to seven; however, these ranges are merely examples and other embodiments may use different ranges. In some embodiments, the processor will determine that an image is not a candidate for animation when the image characteristic fails to meet one or more of the following criteria, such as an image resolution below a resolution threshold; an image size below a size threshold; content type indicating an inability to be cropped; content type indicating the image is not a digital photograph; content type indicating that the image does not include a human or animal face; an aspect ratio outside an aspect ratio range; and a number of salient regions outside a range. Upon determining that the image is a candidate for animation, the processor selects a presentation template having image animation from the plurality of presentation templates, where at least a subset of the plurality of presentation templates does not include image animation. Accordingly, the processor selects the presentation template with image animation based on the image characteristic.

Thus, in some embodiments, the processor will avoid selecting a presentation template with image animation when the image of the identified presentation document has too low of a resolution, too small of a size, an aspect ratio that varies significantly from the target region or visible region within the presentation template, or that has too many or too few salient regions. Determining that the image is a candidate for animation before selecting a presentation template with animation can improve the likelihood that a selected template will provide an aesthetically pleasing presentation document, and reduce the likelihood of selecting a template that will result in a low resolution, heavily distorted, or unintelligible image animation within the presentation document.

In some embodiments, the criteria used for determining whether the image is a candidate for animation are based on one or more characteristics of each presentation template. For example, each presentation template of the plurality of presentation templates may specify one or more of a resolution threshold, a size threshold, a content type, an aspect ratio range, and a range of the number of salient regions. For example, in some embodiments, the resolution threshold and the size threshold are set based on the size of the visible region and the size of the target region for the image in the presentation template. In general, the larger the visible region, the greater the resolution threshold and the size threshold; and, similarly, the larger the target region, the greater the resolution threshold and the size threshold.

For example, an image with low resolution and no ability to be cropped without losing important information may not be considered a candidate for animation for presentation templates having large visible regions and animation definitions that zoom and crop salient regions of the image. However, the processor may determine that the image is a candidate for animation in presentation templates with small visible areas and animation definitions that do not zoom or crop salient regions of the image. An example of such an image is a low resolution image with the name of a business in multiple salient regions. The salient regions may not be amenable to zooming or cropping, but could be rotated through small visible areas of the presentation template to animate the image. In another example, an image having twenty salient regions (for example, one for each automobile in a parking lot image), may be considered too many salient regions for a smooth and visually attractive animation. In some embodiments, however, in block 220, the processor is configured to rank detected salient regions and select a maximum number of salient regions (for example, the top salient regions as determined by salient region detection software based on size, contrast, clarity, and other characteristics). Limiting the salient regions in block 220 to being within a certain range can increase the likelihood of the image being considered a candidate for animation.

In some embodiments, the processor uses a weighted algorithm and considers a plurality of image characteristics to determine whether the image is a candidate for animation. In the weighted algorithm, various weights may be given to the characteristics to render certain characteristics as more important in the template selection. When the weighted algorithm results in a value above a certain threshold, the processor will consider the image a candidate for animation. Additionally, in the weighted algorithm, the processor may consider certain image characteristics as tending in favor of selecting a presentation template with image animation, and other image characteristics as tending against selecting a presentation template with image animation.

Accordingly, the processor selects the presentation template with image animation based on the image characteristics. In some embodiments, the processor considers additional information in selecting the presentation template. For example, the processor determines characteristics of the identified presentation document, such as the amount of text, the number of images, and the organization of the text. The processor further bases the selection on these characteristics. For example, the processor may select a presentation without animation when the presentation document includes a significant amount of text (for example, several sentences, clauses, or bulleted list of text) covering a certain percentage of the presentation document (for example, 50% or 75%), or may select a presentation template with animation for the image, but also with an area for text commensurate with the amount of text in the identified presentation document. Additionally, in some embodiments, the processor considers rankings of the presentation templates based on prior user feedback and selection rates, described in further detail below.

In block 240, the processor, such as the processor 141 or the processor 151 executing the image animation software 145, applies the presentation template with image animation, selected in block 230, to the presentation document identified in block 210. Applying the presentation template to the presentation document includes applying the attributes of the presentation template to the presentation document, which include, for example, applying the layout defined by the presentation template to the presentation document, applying the color scheme defined by the presentation template to the presentation document, and applying the animation defined by the presentation template to the presentation document. The application of such attributes may include overwriting or adding additional data to a digital data file that defines the presentation document. Applying the animation defined by the presentation template to the presentation document includes mapping the animation actions to the image of the presentation document. An example of such mapping is described in further detail with respect to FIG. 3 below.

In block 250, the processor, such as the processor 141 or the processor 151 executing the image animation software 145, outputs the presentation document with the presentation template applied. For example, in the case of the processor 141, the output of the presentation document in block 250 may include one or more of displaying the presentation document on the display 147 including with animating the image in accordance with the presentation template, storing the presentation document to the storage device 142, transmitting the presentation document to the application server 130 via the communication network 120 (for example, for storage thereon), or transmitting the presentation document via the communication network 120 to another computing device for display or storage. In the case of the processor 151, the output of the presentation document in block 250 may include one or more of displaying the presentation document on the display 157 including with animating the image in accordance with the presentation template, storing the presentation document to the storage device 152, transmitting the presentation document to the user device 140 via the communication network 120 (for example, for storage on the storage device 142 or display on the display 147), or transmitting the presentation document via the communication network 120 to another computing device for display or storage.

Although the method 200 is described with respect to a characteristic of the image, the method 200 may use one or more characteristics of the image. For example, in block 220, identifying a characteristic of the image may include identifying characteristics of the image and, in block 230, the presentation template may be selected based on the characteristics.

Figure 3:
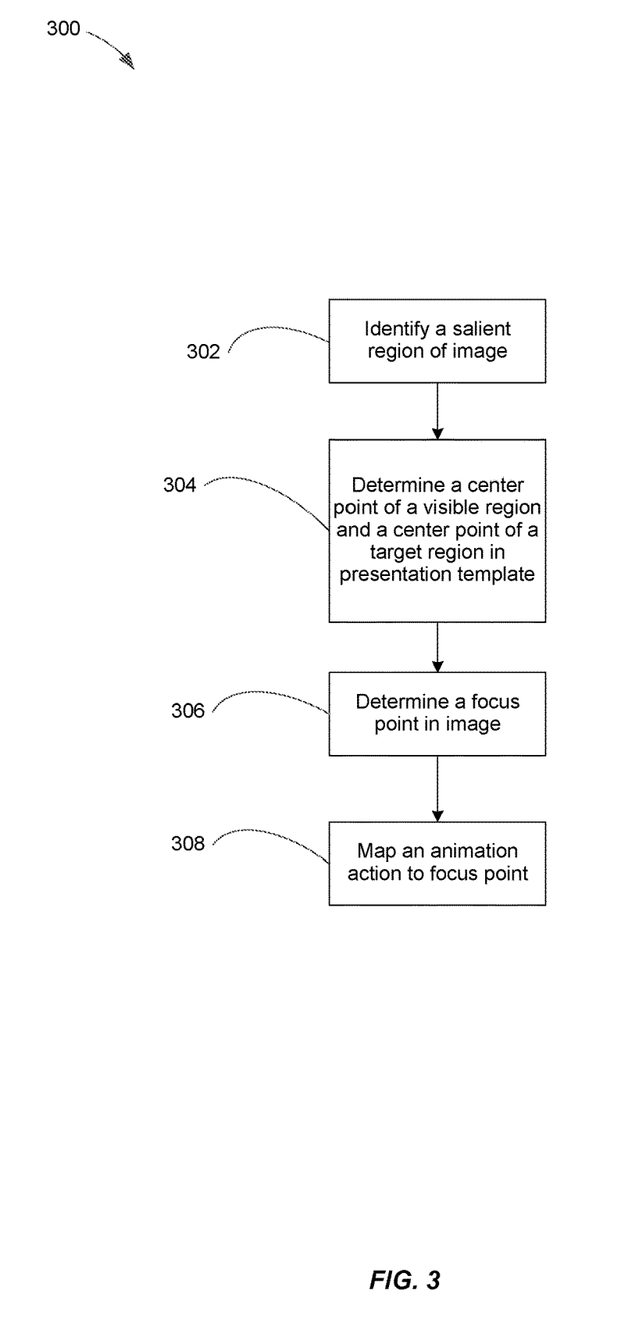
FIG. 3 illustrates a method for mapping animation defined in a presentation template to an image of a presentation document.

FIG. 3 illustrates a method 300 for mapping animation defined in a presentation template to an image of a presentation document. In some embodiments, such a mapping occurs in applying a presentation template with animation to a presentation document as described with respect to block 240 of FIG. 2. In other words, the processor executing the image animation software 145 and implementing the method 200 of FIG. 2 is operable to implement the method 300 to carry out block 240 of the method 200.

In block 302, the processor executing the image animation software 145 identifies one or more salient regions of the image. For example, the image is the image of the presentation document identified in block 210 and having the image characteristic identified in block 220. Salient regions within an image are, for example, areas within the image containing distinct or prominent objects (for example, a face, a person, animal, house, flower, star, or mountain) as determined by image processing software. In some embodiments, the salient regions were previously identified in block 220 when identifying the characteristic of the image. Accordingly, in block 302, the processor accesses previously stored information identifying the salient regions of the image, for example, stored in the storage device 142 or 152. In some embodiments, the processor executes image processing software to identify salient regions of the image in block 302. The image processing software includes, for example, one or more feature detection algorithms such as an edge detection algorithm, a corner detection algorithm, a blob detection algorithm, or the like. The processor, via the image processing, identifies regions of the image having crisp lines or sharp changes in contrast, which raise the certainty of the region being identified as a salient region, while unconnected line segments or subtle changes lower the certainty. Crisp lines or sharp changes in contrast may indicate the presence of a distinct or prominent object within the image. Thus, in some embodiments, a salient region is a region within an image determined, by the processor, to have a change in contrast or color with a neighboring region or boundary that is above a threshold; to include an object (for example, a face, person, animal, house, flower, star, or mountain) with a shape or profile that matches at least one of a plurality pre-stored objects in a repository accessed by the processor; or a combination thereof. The processor, via the image processing, may rank identified (candidate) salient regions based on certainty of object recognition, size of the candidate salient region compared to a visible area in presentation template, and other factors, to select the salient regions to be identified in block 302. Those candidate salient regions ranking below a certain number (for example, below fifth, sixth, or seventh) may be disregarded, while the other candidate salient regions ranked higher are identified as the salient regions of the image in block 302.

Figure 4:
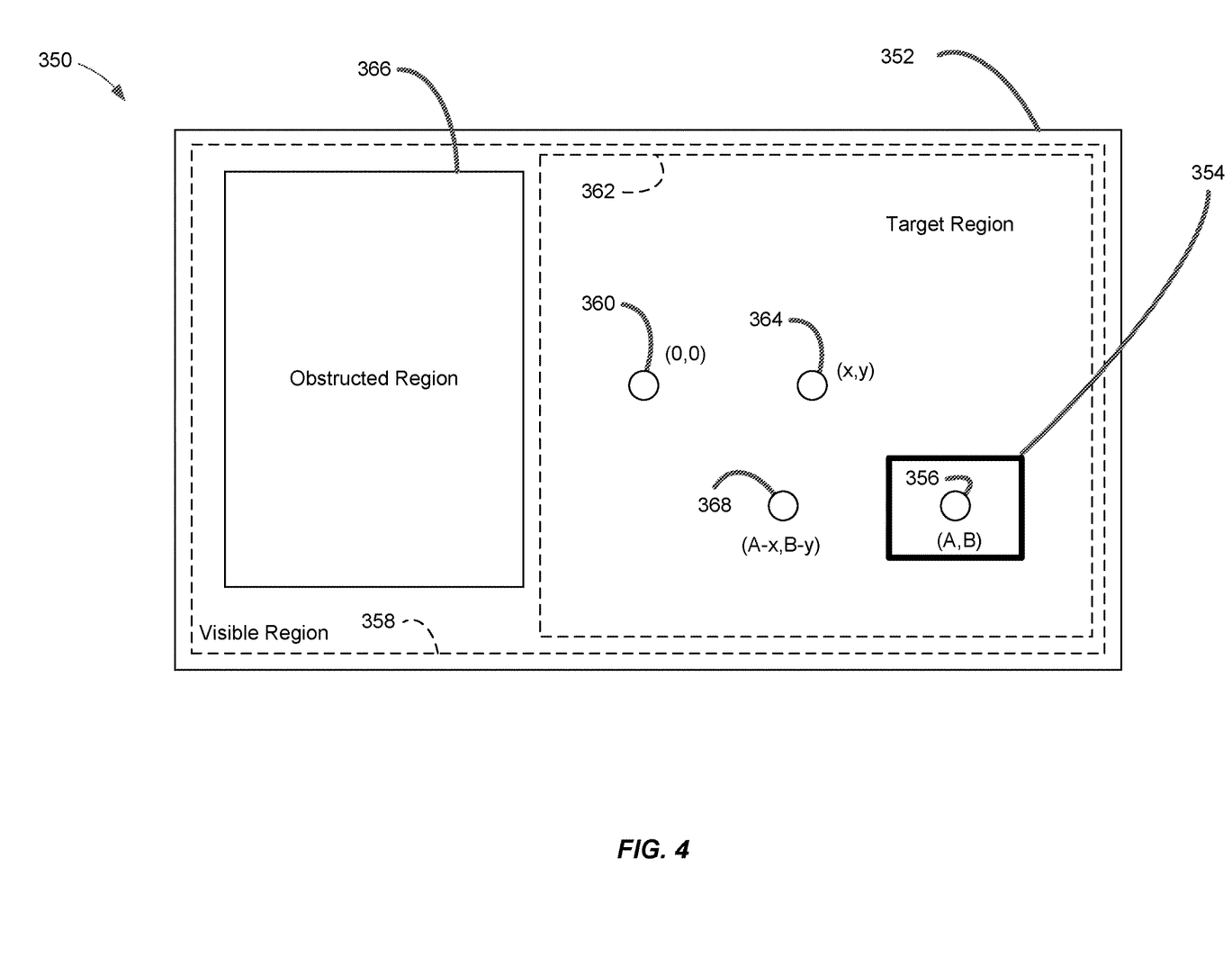
FIG. 4 illustrates a presentation document having an image for animation.

As an example, FIG. 4 illustrates a presentation document 350 having an image 352 for animation. The image 352 includes a salient region 354 having a salient point 356 at its center. While the presentation document 350 may include further salient regions, only the salient region 354 is highlighted in FIG. 4 for ease of description and understanding.

Returning to FIG. 3, at block 304, the processor executing the image animation software 145 determines the center point of the visible region of the presentation template and the center point of the target region of the presentation template. The processor may determine the center points from the presentation document or by calculating a center based on the dimensions of the regions. For nonrectangular regions, such as circles, ellipses, trapezoids, and other geometric shapes, the center point may be considered the centroid or center of mass of the region. Returning to the example of FIG. 4, the presentation document 350 further includes a visible region 358 having a center point 360 and a target region 362 having a center point 364. The presentation document 350 further includes an obstructed region 366 that blocks the view of the image 352. The visible region 358, the target region 362, and the obstructed region 366 may be part of the layout defined by an associated presentation template of the presentation document 350.

At block 306, the processor executing the image animation software 145 determines a focus point of the image for each identified salient region based on the location of the salient region, the center point 360 of the visible region 358, and the center point 364 of the target region 362. For this determination, the processor may use a Cartesian (x-y) coordinate plane and assign the center point 360 of the visible region to be the origin point (0,0). With respect to the example presentation document 350 of FIG. 4, with the center point 360 at point (0,0), the center point 364 is at point (x,y), and the salient point 356 is at point (A,B). The focus point associated with the salient point 356, focus point 368, is then calculated to be at point (A-x, B-y). Thus, an offset of center point 364 with respect to the center point 360 is used as an offset for the focus point 368 with respect to the salient point 356.

At block 308, the processor executing the image animation software 145 maps the animation actions of the animation defined by the presentation template to the focus points of the image identified in block 306. For example, the animation defined by the presentation template may include one or more animation actions (for example, zoom, pan, blur, focus, color-change, filter, rotate, and the like) in an ordered list. Each action may be mapped to an identified focus point to define the animation of the image with respect to the focus point. For example, an animation definition may specify the following ordered operation of animation actions: start with original image cropped to visible region, zoom to focus point one, pan to focus point two, pan to focus point three, return to starting position of original image cropped to visible region. The animation definition may further specify that the ordered operation of animation actions continue on a repeated loop, may specify the speed at which the actions are carried out (for example, pan between points over a period of five seconds or zoom to a focus point over a period of three seconds), and may specify the delay between actions. Then, when the presentation document is displayed (for example, on the display 147 of the user device 140) the image may be animated in accordance with the mapped animation actions. For example, returning to the example presentation document 350 of FIG. 4, during animation of the image, the display 147 may begin with the image 352 cropped to the visible region 358 (as shown in FIG. 4). Next, the processor may animate the image by zooming in on the image 352 (for example, a 150%, 200%, or 250% magnification) while panning the image to align the focus point 368 with the center point 364 of the target region 362. Thus, at the end of this animation action, the image 352 will be magnified and centered within the target region 362 at the focus point 368. After a predetermined time elapses (for example, one second, ten seconds, or one minute), which may be provided by the animation definition of the presentation template, the processor may execute the next animation action, which may be to return to the starting position of the image 352 as illustrated in FIG. 4. As the animation actions are mapped the focus points of the image, and the focus points are based on the salient regions, the center point of the target region, and the center point of the visible region, the animation is defined based on the characteristic of the image including the salient regions, and a layout of the presentation template including the target and visible regions.

In some embodiments, an animation action includes mapping a salient region identified in block 302 to the target region of the presentation template. To map the salient region to the target area, the salient region is centered (in other words, the center of the salient region and center point of the target region are aligned) and the salient region is magnified until the salient region fills the target region. Such mapping, as may be the case with other animation actions, may include cropping of the salient region to display the salient region only within the target region and avoiding overflow outside boundaries of the presentation document. Conversely, the salient image may be enlarged or reduced as needed to completely fill the visible region. For example, a salient region in the shape of a rectangle with size 400 pixels in length and 200 pixels in height with a center point at $x_{sr}=200$, $y_{sr}=100$ that is to be mapped to a rectangular visible region of size 500 pixels in length and 300 pixels in height, with location on the presentation document of $x_{va}=1000$, $y_{va}=500$. A mapping of center points in this example would result in detection of a portion of the visible area that is not covered by the salient region due to the salient region height being only 200 pixels. In this example, to fill the visible region, the salient region could be enlarged by 50%, or a factor of 1.5, in both length and height, resulting in a salient region with size 600 pixels in length (original length of 400 pixels multiplied by 1.5) and 300 pixels in height (original height of 200 pixels multiplied by 1.5) with a center point at $x_{sr}=300$, $y_{sr}=150$. Mapping the center point of the salient region to the center point of the visible region may then further involve cropping the left and right sides of the salient region to fit the now 600 pixel length of the salient region to the 500 pixel length of the visible area. In some embodiments, other mapping strategies could be employed with other methods used to resize the salient region, such as matching the length dimension first, changing the dimensions of the salient region, or other methods individually or in combination.

Figure 5:
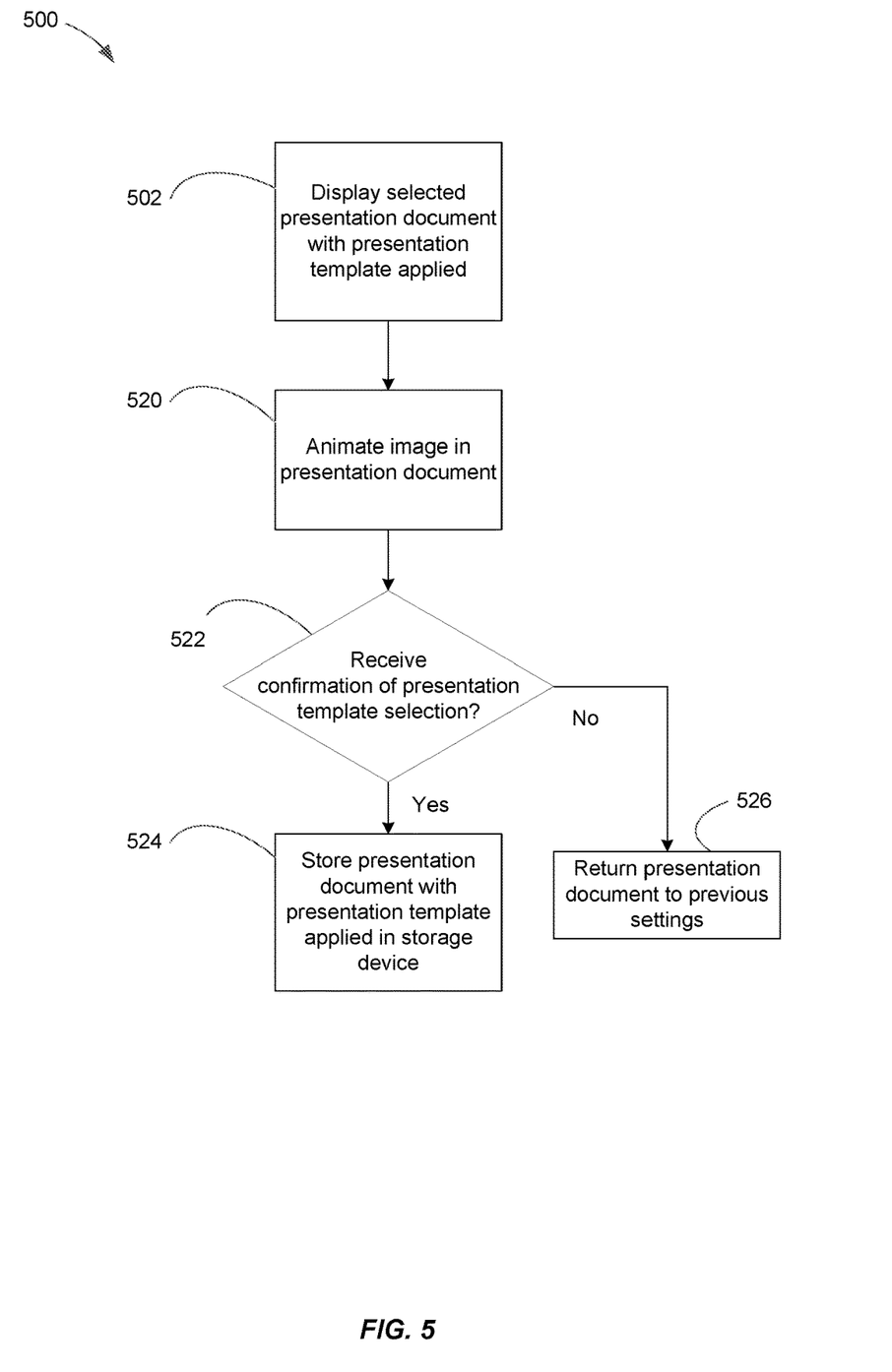
FIG. 5 illustrates a method for outputting a presentation document with an applied presentation template to a user.

FIG. 5 illustrates a method 500 for outputting a presentation document with applied presentation templates and animations to a user, according to one embodiment. In some embodiments, such outputting occurs when outputting the presentation document with the applied presentation template having animation as described with respect to block 250 of FIG. 2. In other words, the processor executing the image animation software 145 and implementing the method 200 of FIG. 2 is operable to implement the method 500 to carry out block 250 of the method 200, at least in part.

In block 502, the processor 141 displays the presentation document on the display 147 on user device 140, the presentation document having had the presentation template with image animation applied at block 240. For example, with reference to FIG. 6, the processor 141 displays the presentation document in a preview window 510 of a graphical user interface 512 generated by the processor 141 on the display 147. In the preview window 510, the processor 141 displays the presentation document identified in block 210 with the presentation template selected in block 230. In block 520, while displaying the presentation document in the preview window 510, the processor 141 animates the image of the presentation document in accordance with the animation definition applied in block 240. In block 522, the processor 141 determines whether a user indication has been received by the processor 141 confirming the application of the presentation template to the presentation document. For example, the user may use a mouse or touchscreen to click on the preview window 510 or another input button to indicate the confirmation. In response to receiving the confirmation, in block 524, the processor 141 saves the presentation document with the applied presentation template in the storage device 142 or another memory. In response to receiving an indication that the user declined to confirm the presentation template (for example, via a mouse click received on a decline button), in block 526, the processor 141 returns the presentation document to the presentation settings previously assigned to the document.

In some embodiments, an indication of the confirmation is also provided to the template repository 110 for use in a popularity ranking of the presentation template. In general, the more often a template in the template repository 110 is associated with a confirmed application of the application template to a presentation document, the higher the popularity ranking of the presentation template and the more likely that the particular presentation template will be selected in block 230 of a future iteration of the method 200. Similarly, in the event a user indication is received indicating that the presentation template is not confirmed by the user, such an indication is provided to the template repository 110 for use in ranking the presentation template.

Figure 6:
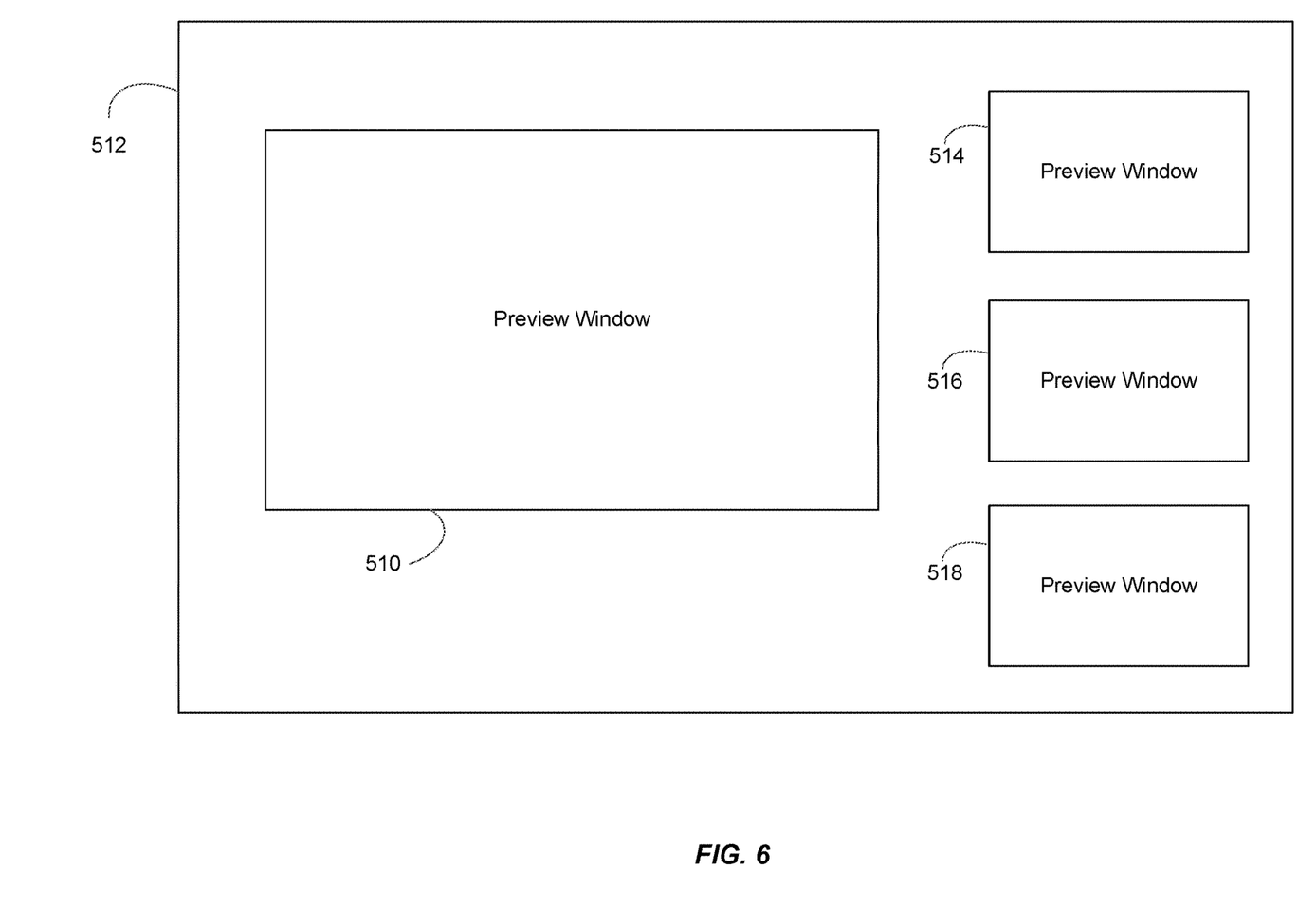
FIG. 6 illustrates a graphical user interface including a preview window for displaying a presentation document with an applied presentation template.

In some embodiments, multiple presentation templates are selected and applied to the presentation document to provide multiple template previews from which a user can select. More particularly, in some embodiments, blocks 230, 240, and 250 are executed two or more times for the presentation document identified in block 210, each time resulting in the output of a presentation document having a different presentation template applied thereto. Each presentation template may have a different animation definition with different animation actions, different delays between animation actions, or different number of image focus points mapped. Accordingly, in some embodiments, in block 502 of the method 500 in FIG. 5, in addition to the preview of the presentation document having the presentation template in the preview window 510 previously described, the presentation document is also displayed on the graphical user interface 512 having other presentation templates applied thereto in preview windows 514, 516, and 518, respectively. Accordingly, in block 502, the processor 141 displays the presentation document with a first presentation template in the preview window 510, with a second presentation template in the preview window 514, with a third presentation template in the preview window 516, and with a fourth presentation template in the preview window 518. The first presentation template may be referred to as a selected template, and the second, third, and fourth presentation templates being previewed in the preview windows 514, 516, and 518 may be referred to as alternate templates. In response to a user selection, for example, via a mouse click or touchscreen input on one of the preview windows 514, 516, or 518, the processor 141 swaps presentation templates such that the first presentation template becomes an alternate template and the alternate template of the selected preview window becomes the selected template previewed in the preview window 510.

In some embodiments, in block 520, the processor 141 animates the image of the presentation document in each of the preview windows 510, 514, 516, and 518 on the display 147. For example, the animation may be performed automatically upon completion of block 502 without further user input, or may be performed selectively for each preview window 510, 514, 516, and 518, respectively, upon the processor 141 detecting a mouse cursor hovering over the particular preview window.

Although the graphical user interface 112 is illustrated having four preview windows illustrating four presentation templates, in some embodiments, fewer or more than four preview windows are provided for fewer or more than four presentation template previews in the graphical user interface 512.

Although the methods 200, 300, and 500 illustrated in FIGS. 2, 3 and 5 are shown and described as a series of serially executed steps, in some embodiments, one or more of the steps are performed in parallel or in a different order than illustrated. Additionally, although the methods 200, 300, and 500 are described with respect to the image animation systems 100 and 150 described above, in some embodiments, other image animation systems are used to implement the method 200

Various features and advantages of some embodiments are set forth in the following claims.

What is claimed is:

1. A system for presentation template selection, the system comprising:
 a memory storing instructions;
 a processor that is coupled to the memory and that is configured to execute the instructions to:
  identify a presentation document including an image;
  identify a characteristic of the image, the characteristic including a number of salient regions of the image;
  determine that the number of salient regions of the image is within a desired range;
  select a presentation template to define characteristics of the presentation document including image animation in the presentation document from a plurality of available presentation templates, the selection based on the number of salient regions of the image being within the desired range;
  apply the presentation template with image animation to the presentation document to define animation of the image; and
  output the presentation document with the presentation template applied.

2. The system of claim 1, wherein the characteristic of the image comprises:
 at least one selected from the group of a resolution of the image, a content type of the image, and an aspect ratio of the image.

3. The system of claim 1, wherein, to select the presentation template with image animation, the processor is configured to determine at least one selected from the group of:
 that the image is above a resolution threshold,
 that an image size of the image is above a size threshold,
 that a content type of the image indicates an ability to be cropped,
 that a content type of the image indicates the image is a digital photograph,
 that a content type of the image indicates the image includes a face, and
 that an aspect ratio of the image is within an aspect ratio range.

4. The system of claim 3, wherein, to select the presentation template with image animation, the processor is further configured to:
 select the presentation template based also on a popularity ranking of the presentation template.

5. The system of claim 1, wherein, to apply the presentation template to the presentation document to define animation of the image, the processor is further configured to:
define the animation of the image in the presentation document based on the characteristic of the image and a layout of the presentation template.

6. The system of claim 5, wherein, to define the animation of the image in the presentation document based on the characteristic of the image and the layout of the presentation template, the processor is further configured to:
identify a salient region of the image;
determine a center point of a target region and a center point of a visible region of the presentation template;
determine a focus point in the image based on the center point of the target region, the center point of the visible region, and the salient region; and
map an animation action of the presentation template to the focus point.

7. The system of claim 1, further comprising a user device including a second processor and a display, wherein the processor resides on an application server and, to output the presentation document, the processor is further configured to:
transmit to the user device, via a network, the presentation document with the presentation template applied.

8. The system of claim 1, wherein the processor resides on a user device and is coupled to a display, and the processor, to output the presentation document, is further configured to:
animate the image in the presentation document, in accordance with the defined animation of the image, while displaying the presentation document.

9. A method for presentation template selection, the method comprising:
identifying, by a processor, a presentation document including an image;
identifying, by the processor, a characteristic of the image, the characteristic including a number of salient regions of the image;
determining that the number of salient regions of the image is within a desired range;
selecting, by the processor, a presentation template to define characteristics of the presentation document including image animation in the presentation document from a plurality of available presentation templates, the selection based on the number of salient regions of the image being within the desired range;
applying, by the processor, the presentation template with image animation to the presentation document to define animation of the image; and
outputting the presentation document with the presentation template applied.

10. The method of claim 9, wherein selecting the presentation template with image animation further comprises determining at least one selected from the group of:
that the image is above a resolution threshold,
that an image size of the image is above a size threshold,
that a content type of the image indicates an ability to be cropped,
that a content type of the image indicates the image is a digital photograph,
that a content type of the image indicates the image includes a face, and
that an aspect ratio of the image is within an aspect ratio range.

11. The method of claim 9, wherein applying the presentation template with image animation to the presentation document to define animation of the image further comprises:
defining the animation of the image in the presentation document based on the characteristic of the image and a layout of the presentation template.

12. The method of claim 11, wherein, to define the animation of the image in the presentation document based on the characteristic of the image and the layout of the presentation template, further comprises:
identifying a salient region of the image;
determining a center point of a target region and a center point of a visible region of the presentation template;
determining a focus point in the image based on the center point of the target region, the center point of the visible region, and the salient region; and
mapping an animation action of the presentation template to the focus point.

13. The method of claim 9, wherein outputting the presentation document further comprises at least one selected from the group of:
animating the image in the presentation document, in accordance with the defined animation of the image, while displaying the presentation document; and
transmitting to a user device, via a network, the presentation document with the presentation template applied.

14. The method of claim 9, wherein outputting the presentation document further comprises:
displaying, in a preview window, the presentation document with the presentation template applied;
displaying, in an alternate preview window, the presentation document with an alternate presentation template applied;
receiving a selection of the presentation template or the alternate presentation template; and
storing the presentation document with the presentation template upon selection of the presentation template and with the alternate presentation template upon selection of the alternate presentation template.

15. A non-transitory computer readable medium for presentation template selection including instructions that, when executed by a processor, cause the processor to execute a set of functions, the set of functions comprising:
identifying, by the processor, a presentation document including an image;
identifying, by the processor, a characteristic of the image, the characteristic including a number of salient regions of the image;
determining that the number of salient regions of the image is within a desired range;
selecting, by the processor, a presentation template to define characteristics of the presentation document including image animation in the presentation document from a plurality of available presentation templates, the selection based on the number of salient regions of the image being within the desired range;
applying, by the processor, the presentation template with image animation to the presentation document to define animation of the image; and
outputting the presentation document with the presentation template applied.

16. The non-transitory computer readable medium of claim 15, wherein selecting the presentation template with image animation further comprises determining at least one selected from the group of:
that the image is above a resolution threshold, that an image size of the image is above a size threshold,
that a content type of the image indicates an ability to be cropped,
that a content type of the image indicates the image is a digital photograph,
that a content type of the image indicates the image includes a face, and
that an aspect ratio of the image is within an aspect ratio range.

17. The non-transitory computer readable medium of claim 15, wherein applying the presentation template with image animation to the presentation document to define animation of the image further comprises:
defining the animation of the image in the presentation document based on the characteristic of the image and a layout of the presentation template.

18. The non-transitory computer readable medium of claim 17, wherein, to define the animation of the image in the presentation document based on the characteristic of the image and the layout of the presentation template, further comprises:
identifying a salient region of the image;
determining a center point of a target region and a center point of a visible region of the presentation template;
determining a focus point in the image based on the center point of the target region, the center point of the visible region, and the salient region; and
mapping an animation action of the presentation template to the focus point.

19. The non-transitory computer readable medium of claim 15, wherein outputting the presentation document further comprises at least one selected from the group of:
animating the image in the presentation document, in accordance with the defined animation of the image, while displaying the presentation document; and
transmitting to a user device, via a network, the presentation document with the presentation template applied.

20. The non-transitory computer readable medium of claim 15, wherein outputting the presentation document further comprises:
displaying, in a preview window, the presentation document with the presentation template applied;
displaying, in an alternate preview window, the presentation document with an alternate presentation template applied;
receiving a selection of the presentation template or the alternate presentation template; and
storing the presentation document with the presentation template upon selection of the presentation template and with the alternate presentation template upon selection of the alternate presentation template.

* * * * *